United States Patent [19]

Gaworowski et al.

[11] 4,086,386
[45] Apr. 25, 1978

[54] SMASH-RECOVERABLE PRINTING BLANKET

[75] Inventors: Andrew J. Gaworowski, Waynesville; John C. Duckett, Clyde, both of N.C.

[73] Assignee: Dayco Corporation, Dayton, Ohio

[21] Appl. No.: 731,490

[22] Filed: Oct. 12, 1976

[51] Int. Cl.$^2$ .................................................. B32B 5/18
[52] U.S. Cl. ............................ 428/307; 428/314; 428/315; 428/316; 428/323; 428/327; 428/317; 428/494; 428/496; 428/507; 428/508; 428/509; 428/510; 428/515; 428/517; 428/909; 156/145; 101/453
[58] Field of Search ............ 428/307, 323, 327, 314, 428/315, 316, 317, 494, 496, 507–510, 515, 517, 909

[56] References Cited

U.S. PATENT DOCUMENTS

| | | |
|---|---|---|
| 2,374,862 | 5/1945 | Green ........................... 428/307 X |
| 3,795,568 | 3/1974 | Rhodarmer et al. ........... 428/909 X |
| 3,978,268 | 8/1976 | Kameda ........................... 428/368 |
| 3,983,287 | 9/1976 | Goosen et al. ................ 428/909 X |

*Primary Examiner*—P. C. Ives
*Attorney, Agent, or Firm*—Reuben Wolk

[57] ABSTRACT

A smash-recoverable printing blanket having a substantially uniform thickness and method of making same are provided wherein the blanket comprises a plurality of layers including at least one layer adapted to swell upon being contacted by a liquid and a plurality of microcapsules disposed within the blanket with the microcapsules containing the liquid; and, the microcapsules are adapted to be ruptured upon smashing the blanket to thereby release the liquid contained therewithin against the one layer causing swelling thereof and restoring of the adjacent layers substantially to their original position prior to the smashing to define the uniform thickness.

10 Claims, 9 Drawing Figures

SMASH-RECOVERABLE PRINTING BLANKET

BACKGROUND OF THE INVENTION

This invention relates to a printing blanket which is self recovering after smashing thereof and to a method of making such a blanket.

Printing blankets comprised of a plurality of laminated layers are in wide use throughout industry and are often used in offset lithography where the usual function of such a blanket is to transfer printing ink from a printing plate to paper being printed. During the course of using such a printing blanket in offset lithography the blanket may be subjected to large compressive forces or smashing and such smashing is defined as a deformation of the blanket which causes a substantially permanent reduction in its thickness or gauge. The smashing of such a blanket results in an instant deterioration in the quality of the printing and this is due to the fact that the smashed area of the blanket will not transfer printing ink from the plate to the paper in a satisfactory manner.

The usual way of solving the problem of a smashed blanket is to remove such blanket and replace it with a new one. However, there are some instances where it can be determined by inspection that the blanket is not seriously damaged and it is possible to restore the smashed area by swelling layers adjoining the smashed area using a suitable solvent. With either of these solutions, it is necessary to stop the printing press and remove the damaged blanket and this results in substantial material losses but more importantly results in loss of valuable press time.

Printing blankets have been proposed heretofore where efforts have been made to make them sufficiently compressible that they are not damaged by moderate compressive forces. Further, printing blankets of laminated construction have been proposed that are smash resistant.

However, the desired optimum situation would be to provide a printing blanket and method of making such a blanket which when subjected to excessive compression or smashing is self-recovering, i.e., the construction of such a blanket is that it restores itself to its original thickness, without stopping and removing the damaged blanket or stopping the associated printing apparatus or press.

SUMMARY

It is a feature of this invention to provide a simple and economical printing blanket particularly adapted to be used in offset printing, or the like, which is self-recovering after smashing or excessive compression thereof.

Another feature of this invention is to provide a method of making such a blanket that is self-recovering after smashing.

Another feature of this invention is the provision of a method of automatically restoring the original thickness or gauge of a multiple-layer printing blanket.

Another feature of this invention is to provide a blanket having a plurality of layers including at least one layer which is adapted to expand or swell upon being contacted by a liquid and providing container means within the blanket containing such liquid which are adapted to release the liquid upon smashing causing swelling and thus restoration of adjacent layers and the entire blanket substantially to its original thickness or gauge.

Another feature of this invention is to provide a smash-recoverable printing blanket which has a substantially uniform thickness and has a plurality of layers one or more of which are adapted to be expanded or swollen upon being contacted by liquid means disposed within the blanket with the liquid means being released during smashing of the blanket.

Another feature of this invention is to provide a smash-recoverable multiple layer printing blanket having at least one elastomeric layer and self acting means within the blanket for expanding or swelling such elastomeric layer after smashing.

Another feature of this invention is to provide a smash-recoverable multiple layer printing blanket having at least one fabric layer and having self acting means within the blanket for expanding or swelling such fabric layer thereof after smashing.

Accordingly, it is an object of this invention to provide a smash-recoverable printing blanket, i.e., one that is self-recovering after smashing and a method of making such a blanket having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
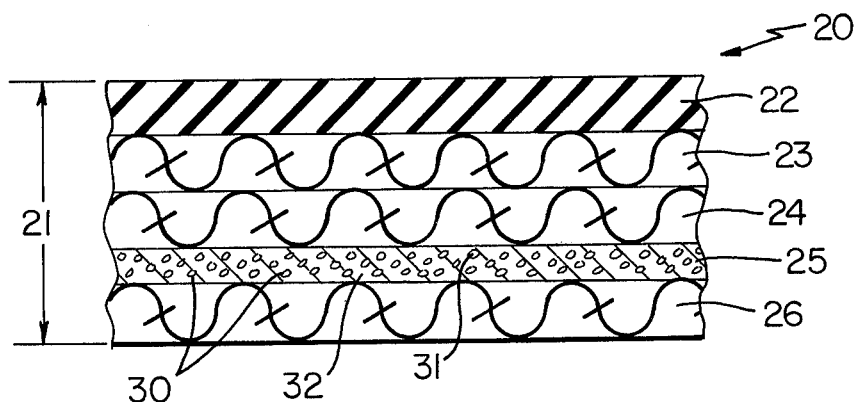
FIG. 1 is a fragmentary cross-sectional view illustrating one exemplary embodiment of a smash-recoverable printing blanket of this invention.

Reference is now made to FIG. 1 of the drawings which illustrates one exemplary embodiment of a smash-recoverable printing blanket of this invention, i.e., a printing blanket which is self recovering after excessive compression or smashing thereof, and such blanket is designated generally by the reference numeral 20 and has a substantially uniform thickness or gauge indicated at 21. The blanket 20 is particularly adapted to be used in offset lithographic printing although such blanket may be used in other applications; and, such blanket is, in essence, self repairing or self recovering and such blanket has integral means to be described in detail subsequently which operates independently and without the attention of an operator of a printing apparatus to assure that the blanket maintains the substantially uniform thickness 21 after being subjected to excessive compression or smashing.

The blanket 20 is comprised of a plurality of layers 22, 23, 24, 25, and 26 which are suitably laminated as a unitary structure utilizing any technique known in the art and in this example, the layer 22 is in the form of a face layer made of a suitable elastomeric material such as a rubber material of the type commonly used to make offset printing blankets while the layers 23, 24, and 26 are in the form of fabric layers with the layer 26 being the bottom layer or bottom ply of the blanket 20. The blanket 20 has at least one layer which is adapted to swell upon being contacted by a liquid and in this example such layer is shown as the layer 25 and the swelling of the layer 25 will be described in detail subsequently.

The blanket 20 has a plurality of microcapsules 30 which are disposed within the blanket 20. In this example of the invention such microcapsules 30 are randomly disposed within the layer 25 and contain a liquid 31 which is particularly adapted to cause swelling of the layer 25 and in particular the main matrix portion 32 of such layer once the liquid 31 is released from the microcapsules 30 and comes into contact with the matrix portion 32 of the layer 25.

Figure 2:
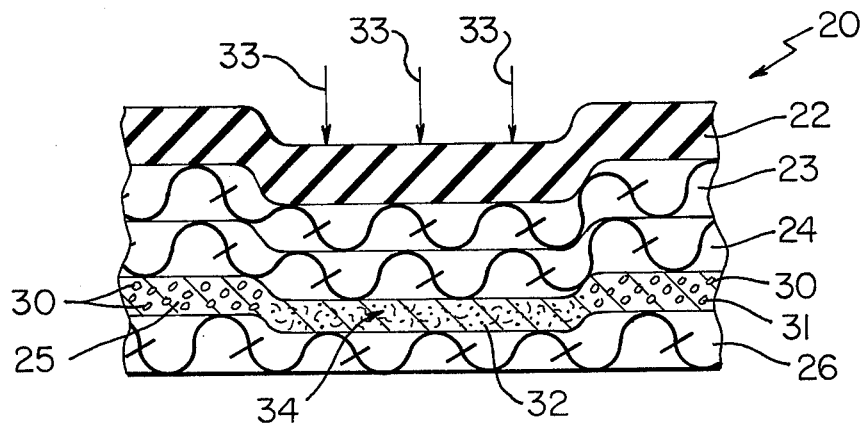
FIG. 2 is a view similar to FIG. 1 illustrating such blanket being subjected to smashing forces.
Figure 3:
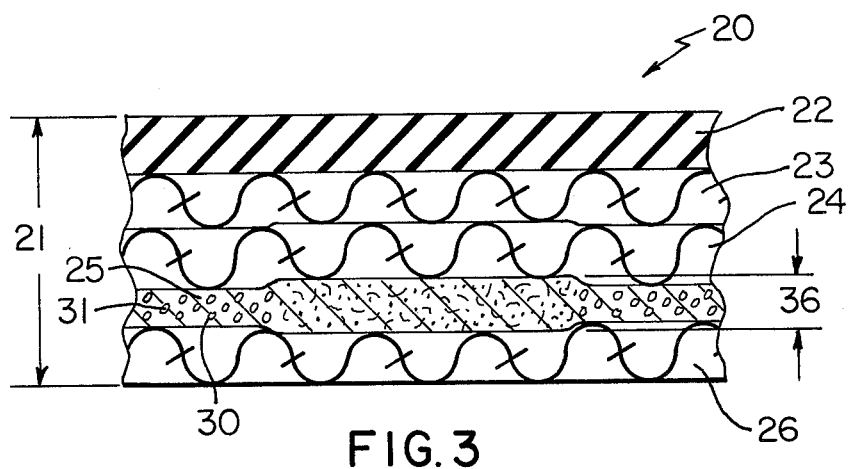
FIG. 3 is a fragmentary cross-sectional view illustrating the manner in which a portion of the blanket has self recovered by expanding substantially to its original thickness.

The microcapsules 30 are, in essence, miniature containers each having a rupturable or severable outer housing or shell which contains the liquid 31 therewithin. Once the blanket 20 is subjected to excessive compression or smash as indicated by the force arrows 33 in FIG. 2 of the drawings, the microcapsules 30 which are subjected to the excessive compressive or smashing forces 33 are ruptured as indicated at 34 in FIG. 2 releasing the liquid 31 therewithin. The released liquid 31 acts upon and causes swelling of its layer 25 and in particular of the matrix portion 32 of such layer 25 with the swelling being indicated at 36 causing restoration of the adjacent layers of the blanket 20 substantially to the positions they occupied prior to smashing and restoring the blanket so that it has its original substantially uniform thickness 21.

Other exemplary embodiments of the smash-recoverable printing blanket of this invention are illustrated in FIGS. 4–5, 6–7, and 8–9 of the drawings. The blankets illustrated in FIGS. 4–5, 6–7, and 8–9 are very similar to the blanket 20; therefore, such blankets will be designated by the reference numerals 20A, 20B, and 20C respectively and representative parts of each blanket which are similar to corresponding parts of the blanket 20 will be designated in the drawings by the same reference numerals as in the blanket 20 (whether or not such representative parts are mentioned in the specification) followed by the letter designation A, B, or C and not described again in detail. Only those component parts of each blanket which are different from corresponding parts of the blanket 20 will be designated by a new reference numeral also followed by an associated letter designation and described in detail.

Figure 4:
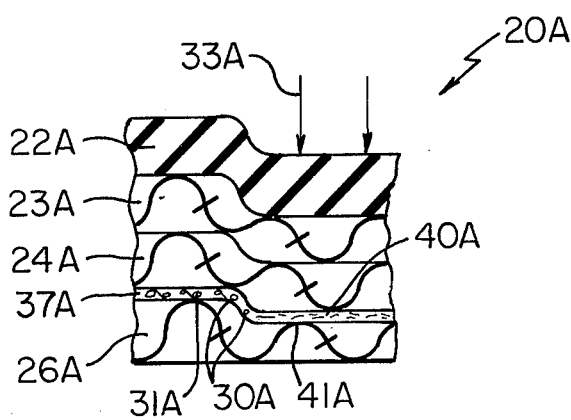
FIG. 4 is a view similar to the left half portion of FIG. 2 illustrating another exemplary embodiment of the blanket of this invention being subjected to smash.

The blanket 20A of FIG. 4 has an elastomeric face layer 22A, a bottom fabric layer 26A, and fabric layers 23A and 24A disposed between the face layer 22A and the bottom layer 26A. However, it will be seen that the blanket 20A has a thickness or coating 37A of microcapsules 30A adjacent one of the layers and in particular the microcapsules 30A are sandwiched between and against facing surfaces 40A and 41A of the layers 24A and 26A respectively.

Figure 5:
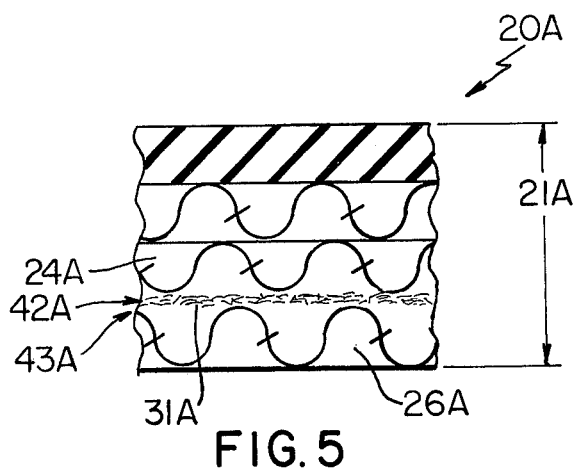
FIG. 5 is a fragmentary view illustrating the self-recovered blanket of FIG. 4.

Each of the microcapsules 30A has liquid 31A disposed therewithin and such liquid is such that it causes swelling of both layers 24A and 26A as shown at 42A and 43A in FIG. 5 for the layers 24A and 26A respectively thereby restoring the blanket 20A to its original thickness 21A. The fabric layers 24A and 26A are preferably made of the same material and each of such layers swells in a similar manner upon being contacted by the liquid 31A forcing adjacent layers outwardly away therefrom to restore the blanket 20A to its original thickness 21A in a similar manner as described in connection with the blanket 20.

Figure 6:
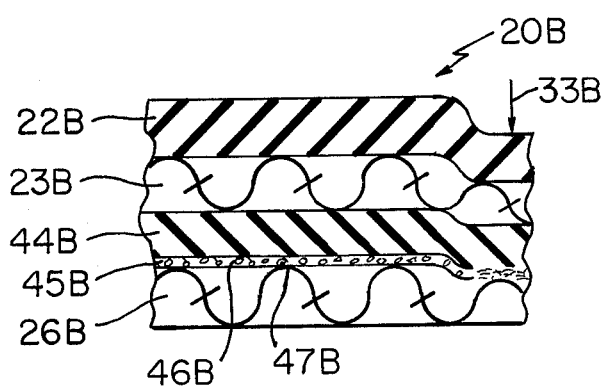
FIG. 6 is a view similar to FIG. 4 illustrating another exemplary embodiment of the blanket of this invention.
Figure 7:
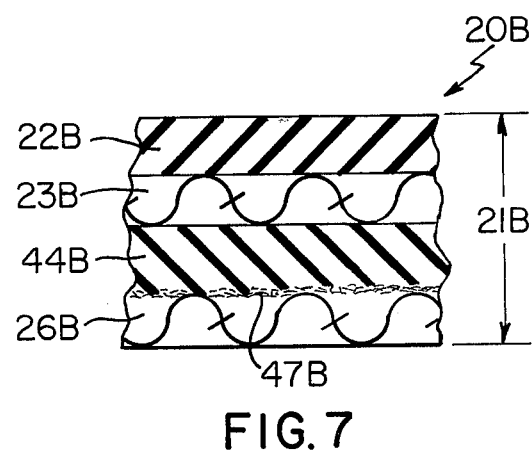
FIG. 7 is a view similar to FIG. 5 illustrating the self-recovered blanket of FIG. 6.

The blanket 20B of FIGS. 6 and 7 is also comprised of a plurality of layers in the form of a face layer 22B, a bottom fabric layer 26B and a fabric layer 23B adjoining the face layer 22B. However, instead of having a fabric layer adjoining the fabric layer 23B, the blanket 20B has an elastomeric layer in the form of a rubber layer 44B suitably laminated against the bottom surface of the layer 23B and the layer 44B has a thickness, layer, or coating 45B comprised of a plurality of microcapsules 46B each containing a suitable organic solvent 47B within its outer shell. The organic solvent 47B is such that it will cause swelling of the elastomeric layer 44B upon coming into contact therewith.

Thus, once the blanket 20B is subjected to compressive or smashing forces 33B the microcapsules 46B are ruptured releasing the organic solvent 47B from therewithin causing such organic solvent to come in contact with the bottom portion of the elastomeric rubber layer 44B. The organic solvent 47B acts upon the rubber in layer 44B causing swelling thereof and causing restoration of the adjacent layers substantially to their original position prior to the smashing to thereby define the uniform thickness 21B.

Figure 8:
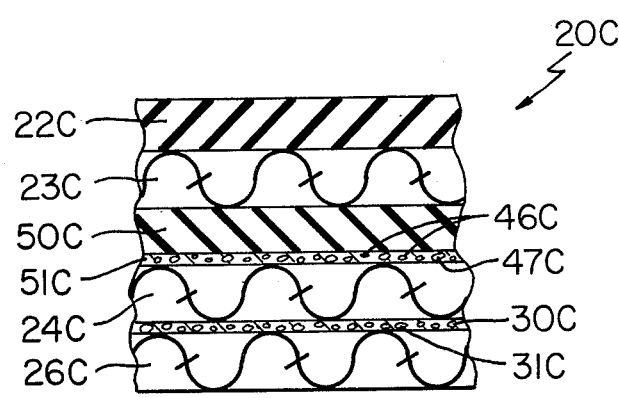
FIG. 8 is a view illustrating another exemplary embodiment of the blanket of this invention prior to smashing thereof.
Figure 9:
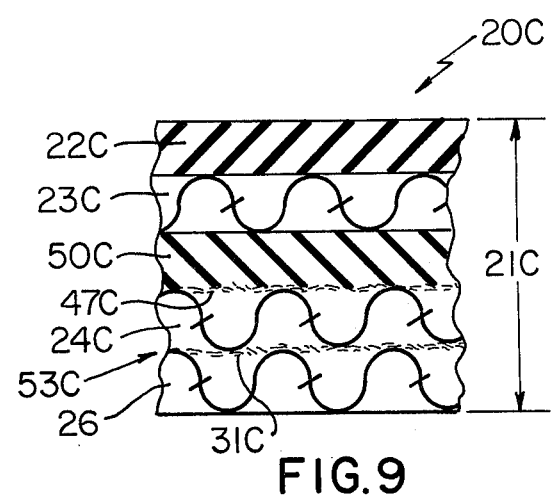
FIG. 9 is a view similar to FIG. 5 illustrating the self-recovered blanket of FIG. 8.

The blanket 20C of FIGS. 8 and 9 has a plurality of suitably laminated layers which in viewing the blanket in cross-section from top to bottom comprise an elastomeric face layer in the form of a rubber layer 22C, a fabric layer 23C, an elastomeric layer in the form of a rubber layer 50C, and a thickness, layer, or coating 51C of microcapsules 46C each containing an organic solvent 47C which is particularly adapted to cause swelling of the elastomeric layer 50C upon coming into contact therewith. The blanket 20C also comprises a fabric layer 24C adjoined by a layer or thickness of microcapsules 30C containing a liquid 31C and such blanket 20C has a bottom ply or layer 26C. The liquid 31C contained in the microcapsules 30C is particularly adapted to cause swelling of one or both of the layers 24C and 26C essentially as shown at 53C in FIG. 9.

Thus, upon subjecting the blanket 20C to compressive or smashing forces the microcapsules 46C are ruptured releasing solvent 47C which causes swelling of the elastomeric rubber layer 50C and simultaneously the microcapsules 30C are ruptured releasing liquid 31C which comes into contact with the layers 24C and 26C causing swelling thereof. The swelling action produced by the released liquid from the two coatings or thicknesses of ruptured microcapsules causes swelling of the layers associated therewith to thereby cause restoration of such layers substantially to their original positions prior to the smashing and thereby restore the blanket 20C to its substantially uniform thickness 21C.

The liquid contained in each of the microcapsules 30, 30A, and 30C may be any suitable liquid which produces swelling or expansion of the fabric layers with which such liquid comes into contact. Similarly, the organic solvent contained in the microcapsules 46B and 46C may be any suitable organic solvent which produces or causes swelling of the rubber layers with which such organic solvent comes into contact once the microcapsules are ruptured.

The face layers 22, 22A, 22B, and 22C of the blankets 20, 20A, 20B, and 20C respectively may be made of any suitable elastomeric material known in the art for this purpose and in this example of the invention each exemplary blanket is shown with its face layer made of rubber. It will also be appreciated that each of the various fabric layers illustrated in connection with the various embodiments of this invention may also be made of any suitable material. Similarly, the elastomeric layers in the form of rubber layers 44B and 50C may be made of any suitable rubber compound or synthetic plastic material. In addition, each of these rubber layers may be reinforced with suitable reinforcing members, stiffening fibers, or other suitable means employed in the art for reinforcing purposes.

The microcapsules 30, 30A, and 30C may be of any suitable size and indeed such microcapsules when used in connection with woven fabric layers made of conventional natural non-metallic yarn such as cotton, or the like, may be filled with water or a water solution. Further, the sizes of the microcapsules may be of various sizes within an acceptable range. For example, such microcapsules 30, 30A, and 30C may be in the form of spheres having an outside diameter ranging between 20 and 200 microns.

It will also be appreciated that the microcapsules 46B and 46C may contain any suitable organic solvent capable of producing swelling of an associated elastomeric or rubber layer used in a printing blanket and examples of organic solvent which may be used are toluene and biphenyl which are shown to be especially useful in producing expansion or swelling of all types of rubber including though not being limited to natural, neoprene, nitrile, polysulfide, butyl, and similar rubbers. It will also be appreciated that the microcapsules 46B and 46C may also be in the form of spheres and may range in diameter between 20 and 200 microns.

The microcapsules have outer shells which may be made of any suitable polymer material used in the process or microencapsulation.

Microcapsules filled with toluene are manufactured and sold by 3M Company, 3M Center, St. Paul, Minn. 55101. Microcapsules containing aromatic hydrocarbons may also be used and have outer shells made of nitrocellulose.

Water-containing capsules may have a shell material made of a suitable vinyl resin. An example of such a vinyl resin is sold under the registered trademark Elvax 40 by the E. I. DuPont de Nemours and Co., Inc. of Wilmington, Del.

Both the water-containing and organic-solvent containing microcapsules may be additionally coated using only suitable process in order to obtain desired properties, such as, increased breaking strength as well as solvent and heat resistance.

Poly-chloro-p-xylene has been used successfully as a coating for a variety of microcapsules by the Union Carbide Corporation, Chemicals and Plastics, 270 Park Ave., New York, N.Y., 10017, in a so-called vapor-deposition process.

It will be appreciated that regardless of the liquid employed in the microcapsules, microcapsules having a broad size range are preferably employed. With microcapsules of different sizes it will be appreciated that the larger microcapsules can be ruptured or severed with lower pressures than the smaller ones.

While present exemplary embodiments of this invention, and methods of practicing the same, have been illustrated and described, it will be recognized that this invention may be otherwise variously embodied and practiced within the scope of the following claims.

What is claimed is:

1. A smash-recoverable printing blanket having a substantially uniform thickness, said blanket comprising, a plurality of layers including at least one layer which swells upon being contacted by a liquid, and a plurality of microcapsules disposed within said blanket with said microcapsules containing said liquid, said microcapsules being ruptured upon smashing said blanket to thereby release said liquid contained therewithin against said one layer causing swelling thereof and restoring said adjacent layers substantially to their original positions prior to said smashing and define said uniform thickness.

2. A blanket as set forth in claim 1 in which said microcapsules are randomly disposed within said one layer.

3. A blanket as set forth in claim 1 in which said microcapsules are provided as a thickness thereof adjacent said one layer.

4. A blanket as set forth in claim 1 in which said plurality of layers includes at least another layer which swells upon being contacted by said liquid, and said microcapsules are provided as a thickness thereof sandwiched between and against facing surfaces of said one and said other layer.

5. A blanket as set forth in claim 3 in which said one layer is a fabric layer.

6. A blanket as set forth in claim 3 in which said one layer is an elastomeric layer.

7. A blanket as set forth in claim 3 in which said one layer is a layer of rubber which swells upon being contacted by said liquid in the form of an organic solvent and said microcapsules contain said organic solvent.

8. A blanket as set forth in claim 1 in which said one layer is disposed closely adjacent the bottom layer of said blanket and said bottom layer is a woven fabric layer.

9. A blanket as set forth in claim 3 in which said plurality of layers comprises a facing layer made of a compressible elastomeric material.

10. A smash-recoverable printing blanket having a substantially uniform thickness, said blanket comprising, a plurality of layers including a first layer which swells upon being contacted by a first liquid, a plurality of microcapsules provided as a thickness thereof adjoining said first layer with said microcapsules containing said first liquid, a second layer which swells upon being contacted by a second liquid, a plurality of microcapsules disposed as a second thickness thereof adjoining said second layer with said microcapsules containing said second liquid, said microcapsules being ruptured upon smashing of said blanket to thereby release the liquids contained therein against their adjoining layers causing swelling thereof and restoring of adjacent layers substantially to their original positions prior to said smashing and define said uniform thickness.

* * * * *